United States Patent
Wetzel et al.

(10) Patent No.: US 6,993,169 B2
(45) Date of Patent: Jan. 31, 2006

(54) SYSTEM AND METHOD FOR FINDING REGIONS OF INTEREST FOR MICROSCOPIC DIGITAL MONTAGE IMAGING

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: Trestle Corporation, Irvine, CA (US)

( * ) Notice: Subject to any disclaimer, the term of this patent is extended or adjusted under 35 U.S.C. 154(b) by 820 days.

(21) Appl. No.: 09/758,037

(22) Filed: Jan. 11, 2001

(65) Prior Publication Data
US 2002/0090120 A1    Jul. 11, 2002

(51) Int. Cl.
*G06K 9/00* (2006.01)

(52) U.S. Cl. .......................... 382/128; 382/299; 348/79

(58) Field of Classification Search ................ 382/128, 382/129, 130, 131, 132, 133, 134, 224–225, 382/168, 203, 263, 270, 274, 282, 291, 298, 382/299, 321; 348/79; 435/5; 377/10
See application file for complete search history.

(56) References Cited

U.S. PATENT DOCUMENTS

| | | | |
|---|---|---|---|
| 3,999,047 A | 12/1976 | Green | 235/151.3 |
| 4,150,360 A * | 4/1979 | Kopp et al. | 382/133 |
| 4,199,748 A | 4/1980 | Bacus | 340/146.3 |
| 4,213,036 A | 7/1980 | Kopp et al. | 235/92 |
| 4,523,278 A | 6/1985 | Reinhardt et al. | 364/413 |
| 4,742,558 A | 5/1988 | Ishibashi et al. | 382/56 |
| 4,779,151 A | 10/1988 | Lind et al. | 360/92 |
| 4,965,725 A | 10/1990 | Rutenberg | 364/413.1 |
| 5,068,906 A | 11/1991 | Kosaka | 382/48 |

(Continued)

FOREIGN PATENT DOCUMENTS

WO    WO 92/13308    8/1992

OTHER PUBLICATIONS

"An Efficient Method for Automated Segmentation of Histochemically Stained Slides", Gaddipati et al., IEEE-EMBC and CMBEC (1995).

(Continued)

*Primary Examiner*—Daniel Miriam
*Assistant Examiner*—Seyed Azarian
(74) *Attorney, Agent, or Firm*—Richard W. James; Arlene P. Neal (57) ABSTRACT

A system for processing a thumbnail image from a microscope slide to determine tissue locations on the slide. The system comprises an image cropping component, a tissue finding component, and a scan control component. The image cropping component crops the thumbnail image and removes portions of the image that fall outside of determined slide boundaries. The cropped image from the image cropping component is inputted into the tissue finding component. The tissue finding component identifies tissue regions by applying a sequence of filters that incorporate knowledge of typical appearance and location of tissue and non-tissue slide regions. The tissue finding component outputs a tiling matrix whose values indicate which tiles should be imaged. The scan control component interprets the tiling matrix and transposes positions of the tiling matrix into actual stage coordinate for a microscopic imaging.

12 Claims, 4 Drawing Sheets

U.S. PATENT DOCUMENTS

| | | | |
|---|---|---|---|
| 5,072,382 A | 12/1991 | Kamentsky | 364/413.08 |
| 5,073,857 A | 12/1991 | Peters et al. | 364/413.1 |
| 5,099,521 A | 3/1992 | Kosaka | 382/6 |
| 5,107,422 A | 4/1992 | Kamentsky et al. | 364/413.08 |
| 5,123,056 A | 6/1992 | Wilson | 382/6 |
| 5,143,193 A | 9/1992 | Geraci | 194/212 |
| 5,163,095 A | 11/1992 | Kosaka | 382/6 |
| 5,216,500 A | 6/1993 | Krummey et al. | 358/93 |
| 5,216,596 A * | 6/1993 | Weinstein | 348/79 |
| 5,218,645 A | 6/1993 | Bacus | 382/6 |
| 5,252,487 A | 10/1993 | Bacus et al. | 436/63 |
| 5,257,182 A | 10/1993 | Luck et al. | 364/413.1 |
| 5,260,871 A | 11/1993 | Goldberg | 364/413.02 |
| 5,268,966 A | 12/1993 | Kasdan | 382/6 |
| 5,287,272 A * | 2/1994 | Rutenberg et al. | 382/224 |
| 5,297,034 A | 3/1994 | Weinstein | 364/413.02 |
| 5,313,532 A | 5/1994 | Harvey et al. | 382/15 |
| 5,333,207 A | 7/1994 | Rutenberg | 382/6 |
| 5,363,258 A | 11/1994 | Coles et al. | 360/92 |
| 5,428,690 A * | 6/1995 | Bacus et al. | 382/128 |
| 5,471,561 A | 11/1995 | Cowgill et al. | 395/82 |
| 5,473,706 A * | 12/1995 | Bacus et al. | 382/133 |
| 5,499,097 A | 3/1996 | Ortyn et al. | 356/372 |
| 5,505,946 A | 4/1996 | Kennedy et al. | 424/195.1 |
| 5,544,650 A | 8/1996 | Boon et al. | 128/632 |
| 5,544,996 A | 8/1996 | Castaldi et al. | 414/280 |
| 5,625,765 A | 4/1997 | Ellenby et al. | 395/135 |
| 5,636,425 A | 6/1997 | Best | 29/407.04 |
| 5,680,694 A | 10/1997 | Best | 29/701 |
| 5,687,251 A | 11/1997 | Erler et al. | 382/133 |
| 5,700,125 A | 12/1997 | Falace et al. | 414/276 |
| 5,768,125 A | 6/1998 | Zinger et al. | 364/167.01 |
| 5,784,162 A | 7/1998 | Cabib et al. | 356/346 |
| 5,796,861 A | 8/1998 | Vogt et al. | 382/128 |
| 5,835,620 A | 11/1998 | Kaplan et al. | 382/133 |
| 5,838,837 A | 11/1998 | Hirosawa et al. | 382/284 |
| 5,848,177 A | 12/1998 | Bauer et al. | 382/128 |
| 5,933,519 A | 8/1999 | Lee et al. | 382/133 |
| 6,031,930 A | 2/2000 | Bacus et al. | 382/133 |
| 6,081,612 A | 6/2000 | Gutkowicz-Krusin et al. | 382/128 |
| 6,101,265 A | 8/2000 | Bacus et al. | 382/133 |
| 6,151,405 A * | 11/2000 | Douglass et al. | 382/133 |
| 6,272,235 B1 * | 8/2001 | Bacus et al. | 382/133 |
| 6,498,006 B2 * | 12/2002 | Wong | 435/5 |

OTHER PUBLICATIONS

"Automatic Threshold Selection Using Histogram Quantization", Wang et al., Journal of BioMedical Optics, vol. 2, No. 2 (Apr. 1997).

"FSED-Feature Selective Edge Detection", Borga et al. (2000).

"Biomarkers of Premalignant Breast Disease and Their Use as Surrogate Endpoints in Clinical Trials of Chemopreventive Agents", Boone et al., The Breast Journal, vol. 1, No. 4 (1995).

"Development of Breast Cancer Chemopreventive Drugs", Kelloff et al., Journal of Cellular Biochemistry, 17G:2-13 (1993).

"Development of Surrogate Endpoint Biomarkers for Clinical Trials of Cancer Chemopreventive Agents: Relationships to Fundamental Properties of Preinvasive (Intraepithelial) Neoplasia", Boone et al., Journal of Cellular Biochemistry, Supplement 19:10-22 (1994).

"Markovian Analysis of Cervical Cell Images", Norman J. Pressman, The Journal of Histochemistry and Cytochemistry, vol. 24., No. 1, pp. 138-144 (1976).

"Quantiation of Preinvasive Neoplastic Progression in Animal Models of Chemical Carcinogenesis", Bacus et al., Journal of Cellular Biochemistry Supplements 28/29:21-38 (1997).

"Analytical and Quantitative Cycology and Hiscology", Chromatin Texture Measurement by Markovian Analysis, Dawson et al.

"The Image Processing Handbook", John C. Russ—2nd ed.

"Segmentation of Mammograms Using Multiple Linked Self-Organizing Neural Networks", Dance et al., Med. Phys. 22(2) (Feb. 1995).

"Hough Spectrum and Geometric Texture Feature Analysis", Zhang et al.

"Cervical Cell Recognition and Morphometric Grading by Image Analysis", James W. Bacus, Journal of Cellular Biochemistry, Supplement 23:33-42 (1995).

"Detection and Characterization of Microcalcifications in Mammographic Images", Pereira et al.

* cited by examiner

SYSTEM AND METHOD FOR FINDING REGIONS OF INTEREST FOR MICROSCOPIC DIGITAL MONTAGE IMAGING

FIELD OF THE INVENTION

The present invention relates to microscopic digital imaging of complete tissue sections for medical and research use. In particular it describes a method to find regions of interest for high throughput montage imaging of microscope slides using a standard microscope and cameras.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application.

Perhaps the most important limitation to microscopic digital imaging is a "sub-sampling" problem encountered in all single frame images. The sub-sampling problem has two components: a field of view problem and a resolution-based problem. The field of view problem occurs when an investigator looking at a single frame cannot determine what lies outside the view of an image on a slide. The resolution-based problem occurs when the investigator looking at an image is limited to the resolution of the image. The investigator cannot "zoom in" for a closer examination or "zoom out" for a bird's eye view. Significantly, the field of view and resolution-based problems are inversely related. Thus, as one increases magnification to improve resolution, one decreases the field of view. For example, as a general rule, increasing magnification by a factor of two decreases the field of view by a factor of four.

To get around the limitations of single frame imaging, developers have looked at two general options. The first option takes the general form of "dynamic-robotic" imaging, in which a video camera on the microscope transmits close to real time images to the investigator looking at a monitor, while the investigator operates the microscope by remote control. Though such systems have been used successfully for telepathology, they do not lend themselves to documentation, collaboration, or computer based analysis.

The second option being investigated to overcome the limitations inherit in single frame imaging is a montage (or "virtual slide") approach. In this method, a robotic microscope systematically scans the entire slide, taking an image at every field. The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 um/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch CCD, the system field of view is approximately (8.8 mm×6.6 mm)/20=0.44×0.33 mm. A standard microscope slide typically has a specimen area of 25 mm×50 mm or 12.5 square centimeters. This requires over eighty-six hundred fields to image this entire specimen region. However, the average tissue section for anatomic pathology is approximately 2.25 square centimeters. This only requires approximately fifteen hundred fields to cover the tissue alone, approximately 80 percent less fields.

Traditionally, field rate in montage systems is limited by three factors—camera frame rate, image processing speed, and the rate of slide motion between fields. Given today's technology, the limiting factor can be reduced to only the camera frame rate. Using a 10 frame per second camera for the example above, imaging the entire slide would require 860 seconds or 14.33 minutes. If only the region of interest was imaged, this average time could be reduced to 150 seconds or 2.5 minutes; substantially increasing the slide throughput of an imaging system.

Thus, a system is needed to automatically find the region of interest on a microscope slide and image only this region.

SUMMARY OF THE INVENTION

The present invention relates to a method and system for processing a thumbnail image from a microscope slide to determine tissue locations on the slide. The system comprises an image cropping component, a tissue finding component, and a scan control component. The image cropping component crops the thumbnail image and removes portions of the image that fall outside of determined slide boundaries. The cropped image from the image cropping component is inputted into the tissue finding component. The tissue finding component identifies tissue regions by applying a sequence of filters that incorporate knowledge of typical appearance and location of tissue and non-tissue slide regions. The tissue finding component outputs a tiling matrix whose values indicate which tiles should be imaged. The scan control component interprets the tiling matrix and transposes positions of the tiling matrix into actual stage coordinate for a microscopic imaging.

Accordingly, it is an object of the invention to provide a microscopic imaging system for whole slide montage in which standard microscope optics, off the shelf cameras and a simple motorized stage can be used to select the region of interest, image only this section and produce perfectly aligned image tiles.

The present invention uses a pre-scan process applied to a macroscopic image of the entire slide, to guide a high-resolution slide scanning process and ensure high-quality images of the entire specimen are acquired. The pre-scan process includes an image cropping component, a tissue-finding component, and a scan control component. The image cropping and tissue finding components identify interesting regions on the slide to be scanned. The scan control component generates the control parameters for a motorized microscopic imaging system.

It is another object of the invention to use a high-resolution slide scanning process to control the operation of the motorized stage and camera. This process utilizes information gathered by the pre-scan process, namely the imaging regions, to control the positioning of the stage to image only the regions of interest and to ensure the individual images are well aligned.

Additional features and advantages of the invention will be set forth in the description that follows, and in part will be apparent from the description, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

DESCRIPTION OF THE PREFERRED EMBODIMENTS

Reference will now be made in detail to the preferred embodiments of the present invention, examples of which are illustrated in the accompanying drawings. The following paragraphs describe the functionality of the inventive system and method for high throughput montage imaging of microscope slides using a standard microscope and cameras.

Figure 1:
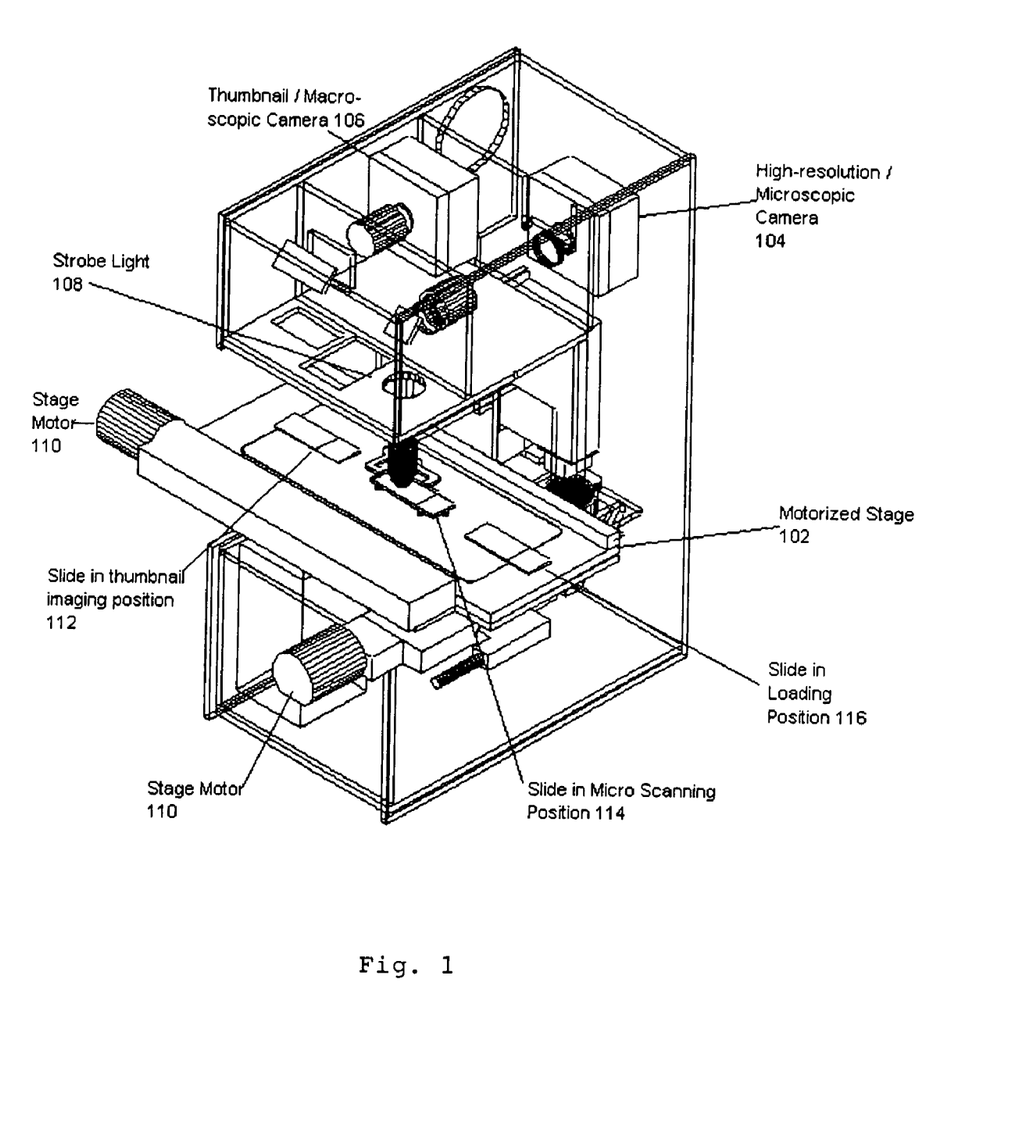
FIG. 1 illustrates an isometric view of the system in a preferred embodiment.

FIG. 1 illustrates a preferred embodiment of the invention. In this embodiment, a slide 112 to be imaged is placed on a thumbnail imaging position in a slide holder on a motorized stage 102. A single frame image containing the entire slide is taken with a macro camera 106. This low-resolution image is analyzed by software components to determine the locations of tissue on slide 112. This information can then be used to generate control parameters for stage 102 and microscopic camera 104 to ensure that the scanning process captures high quality images of only the tissue regions, substantially reducing the time to scan an average slide.

As is obvious to one skilled in the art, although capturing the single macroscopic image saves time, it is not necessary for the operation of the invention. Multiple macroscopic images may be required to generate control parameters to the accuracy required based on the ratio of the macroscopic to microscopic magnifications and the camera specifications of each camera, if separate cameras are utilized.

Specifically in a preferred embodiment, a pre-scan processing of the low-resolution or thumbnail image includes an image cropping component, a tissue-finding component and a scan control component. The image cropping component and tissue finding component identify tissue regions on the slide to be scanned. The scan control component generates the necessary control parameters to scan only the regions of interest under the microscopic optics.

The first step in processing the thumbnail image consists of flat-field correcting the macroscopic thumbnail image using a similar image obtained from the same camera and a blank slide. This removes any spatial light anomalies from the thumbnail image, which may reduce the efficiency of the tissue-finding component. Given the format, or size, of the camera and the aspect ratio of the slide, a portion of the image will contain non-slide objects such as the slide carrier. To remove these features, the thumbnail image is cropped to extract only the slide information.

The image cropping is accomplished via a two-pass process. The first pass determines an approximate location of the slide boundary, and the second pass fine-tunes this estimate. The search for the boundary is conducted over upper and lower intervals corresponding to the regions expected to contain the upper and lower slide edges, respectively. For this discussion, the slide or region of interest is assumed to be positioned near the center, vertically, in the thumbnail image. To facilitate this and subsequent processing steps, a copy of the thumbnail image is converted to grayscale. The portion of the image falling outside of the identified slide boundary is removed. It should be noted that the original color image is also cropped at the estimated edge locations, and then is uniformly reduced in size to produce a small thumbnail image of the slide for rapid, visual slide identification.

Since the slide may not be oriented perfectly horizontal in the original thumbnail image, the identified slide edges are likely to lie at an angle. Thus, even after cropping, there may be remnants of the slide edges or cover slip in the cropped image. Therefore, the image-cropping component attempts to identify pixel blocks that likely contain these remaining edges and flags these blocks as edges that will not be considered for high resolution imaging by the tissue finding component.

The resulting cropped grayscale image generated by the image-cropping component serves as input to the tissue finding component. This component locates regions in the thumbnail image that contain tissue of interest to a specialist. In order to minimize the time and storage space required to accomplish high-resolution slide imaging, the inventive system captures only those regions of the slide that contain tissue. This approach requires that regions containing tissue be identified in the thumbnail image.

The tissue finding component identifies tissue regions via a sequence of filters that incorporate knowledge of the typical appearance and location of tissue and non-tissue slide regions. Initial filtering steps analyze the mean and standard deviation of the local pixel intensities. Pixel mean intensities are used to differentiate tissue-containing regions from blank and other non-tissue regions, such as those containing the slide label or other markings. The standard deviation data represents the amount of variation in pixel values and thus is a good indicator of the border between tissue and the blank slide. The mean and standard deviation data is combined to generate a threshold value that is used to make an initial classification of tissue versus non-tissue. Subsequently, morphological filters are applied to refine the classification based on the size and position of neighboring groups of potential tissue pixels.

The filters which comprise the tissue finding component process the pixels of the cropped grayscale thumbnail image in groups that correspond to slide regions, or tiles, that can be imaged individually during the high-resolution scanning process. These filters ensure that tiles only partially filled with tissue are classified as tissue-containing tiles. The final output of the filter sequence is a tiling matrix whose values indicate which tiles should be imaged; the tiling matrix subsequently guides the high-resolution scanning process.

The above description was based on using the mean and standard deviation of the local pixels as the basis for detecting regions of interest. It is obvious to one skill in the art that other image characteristics can be also used to identify the specimen from non-items of interest such as dust and scratches.

This description was also based on processing a gray scale macroscopic image, the same processing tools can be applied to each of the color components (traditionally, red, green and blue) of a color image. Additional processing tools can also be applied between the color components to refine the tissue finding accuracy and to remove features such as labels and writing that are not critical to the application.

Figure 2:
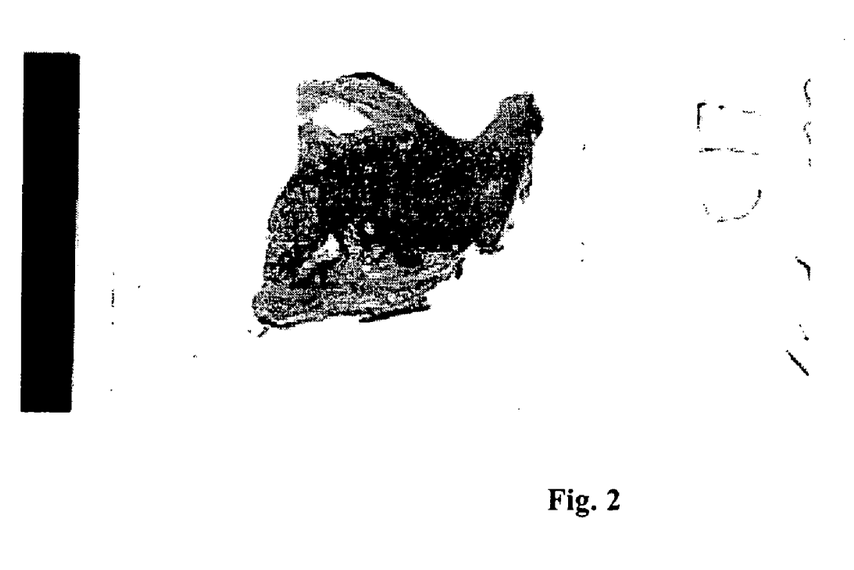
FIG. 2 represents the results of the macroscopic image after the cropping component has been applied to remove non-slide regions.
Figure 3:
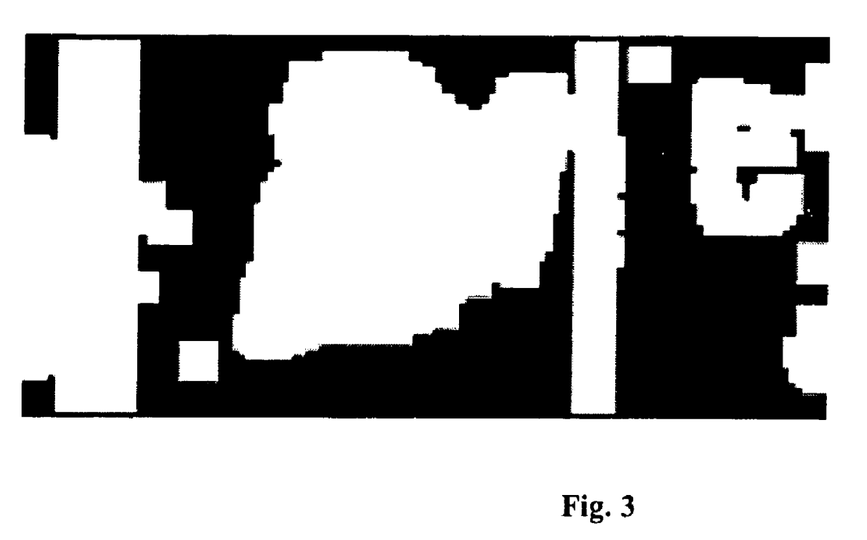
FIG. 3 represents the results of the find tissue component.
Figure 4:
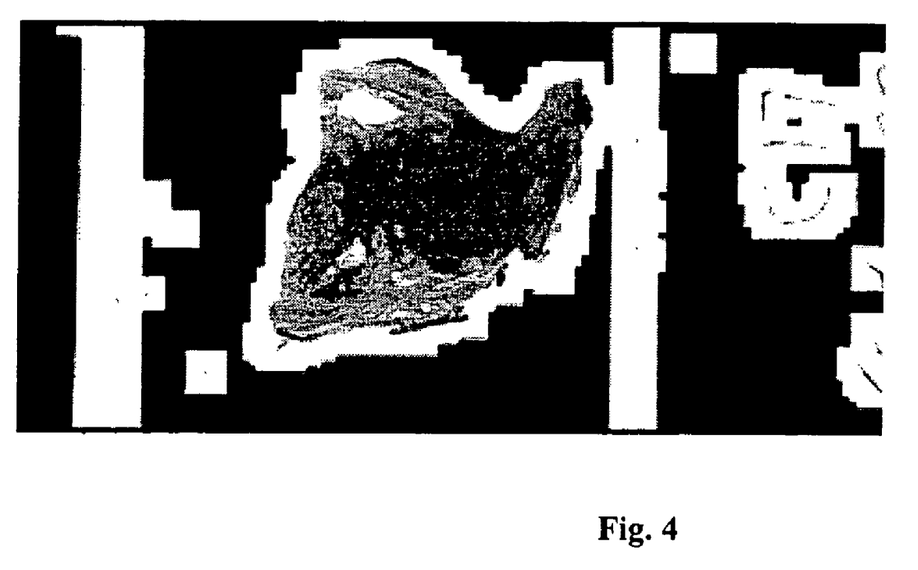
FIG. 4 is an overlay of FIGS. 2 and 3 representing the regions of the slide to be imaged.

An example of the image cropping and find tissue processing are shown in FIGS. 2, 3 and 4. FIG. 2 illustrates the macroscopic image after flat-field correction and image cropping. FIG. 3 illustrates the results of the find tissue component. The resulting tile matrix shown in FIG. 3 has a one-to-one correspondence to the field of view of the microscopic camera. White pixels (binary 1) signify field to be capture and black pixels represent regions not to image. FIG. 4 illustrates an overlay FIGS. 2 and 3 representing the sections of the slide to be imaged. For this application (anatomical pathology), it is imperative to image all suspect regions that may contain tissue so conservative criteria were used in the find tissue component, resulting in cover slip edges and writing etched into the slide to be identified as to be imaged. The savings in the acquisition time is representative by the ratio of the white to black areas of FIG. 3. For this image, only 53% of the slide region is to be imaged, including the label and cover slip edges, and etched writing on the slide.

At the completion of the find tissue component, the scan control component interprets the find tissue tile matrix (FIG. 3) and transposes the positions into actual stage coordinates for the microscopic imaging. A program running on a host computer controls the operation by communicating with a stage controller and microscopic camera 104. Actual scanning can occur in any fashion such as by rows or columns, or in a step fashion to image neighboring areas.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method for processing a low resolution image from a slide to determine a specimen locations on the slide, the method comprising:
    cropping the low resolution image to remove portions of the low resolution image that correspond to non-slide objects, said cropping including determining a location of at least one boundary by searching at least one interval corresponding to at least one boundary region;
    inputting the cropped image into a tissue finding component, wherein the tissue finding component identifies a region containing the specimen by applying a filter that incorporates knowledge of typical appearance and location of specimen and non-specimen slide regions and outputs a matrix whose values indicate which regions of the slide should be imaged, the matrix not including portions of the image falling outside of the boundary; and
    transposing positions of the matrix into actual stage coordinates, and capturing a microscopic image at those stage coordinates.

2. The method of claim 1, wherein the cropping further comprises:
    determining location of a slide boundary by searching upper and lower intervals corresponding to boundary regions expected to contain upper and lower edges of the slide; and
    not including in the matrix portions of the image falling outside of the determined slide boundary.

3. The method of claim 1, further comprising converting a copy of the low resolution image to a grayscale image.

4. The method of claim 2, wherein the low resolution image is a color image, further comprising cropping the color low resolution image at the slide boundary.

5. The method of claim 4, further comprising reducing the color image size to produce a small thumbnail image of the specimen for rapid visual identification.

6. The method of claim 1, further comprising identifying pixel blocks in the cropped image that are likely to contain remaining slide edge features; and
    flagging these features as edges that should not be considered for high resolution imaging.

7. The method of claim 1, further comprising:
    converting a copy of the low resolution image to grayscale; and
    analyzing at least one of mean and standard deviation of local pixel intensities to generate a threshold value.

8. The method of claim 7, further comprising using the pixel intensity to differentiate tissue-containing regions from blank regions and other non-tissue containing regions.

9. The method of claim 1, further comprising applying a morphological filter to the matrix to identify slide regions that can be imaged individually during a high-resolution imaging process.

10. The method of claim 1, wherein the low resolution image is taken automatically without human intervention, the low resolution image is cropped automatically without human intervention, the specimen containing region is identified automatically without human intervention, and the positions of the matrix are transposed automatically without human intervention.

11. The method of claim 1, further comprising flat-field correcting the image using a blank slide image to remove anomalies from the low resolution image.

12. The method of claim 1, wherein the components are software components executed by a computer.

* * * * *

(12) EX PARTE REEXAMINATION CERTIFICATE (6920th)
United States Patent
Wetzel et al.

(10) Number: US 6,993,169 C1
(45) Certificate Issued: Jul. 7, 2009

(54) SYSTEM AND METHOD FOR FINDING REGIONS OF INTEREST FOR MICROSCOPIC DIGITAL MONTAGE IMAGING

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: Carl Zeiss MicroImaging AIS, Inc., Thornwood, NY (US)

Reexamination Request:
No. 90/008,030, Aug. 4, 2006

Reexamination Certificate for:
Patent No.: 6,993,169
Issued: Jan. 31, 2006
Appl. No.: 09/758,037
Filed: Jan. 11, 2001

(51) Int. Cl.
*G06K 9/00* (2006.01)

(52) U.S. Cl. .................. 382/128; 382/128; 382/288; 348/79

(58) Field of Classification Search .................. 382/128, 382/132, 154
See application file for complete search history.

(56) References Cited

U.S. PATENT DOCUMENTS

| | | |
|---|---|---|
| 3,999,047 A | 12/1976 | Green |
| 4,136,950 A | 1/1979 | Labrum et al. |
| 4,150,360 A | 4/1979 | Kopp et al. |
| 4,199,748 A | 4/1980 | Bacus |
| 4,213,036 A | 7/1980 | Kopp et al. |
| 4,523,278 A | 6/1985 | Reinhardt et al. |
| 4,742,558 A | 5/1988 | Ishibashi et al. |
| 4,779,151 A | 10/1988 | Lind et al. |
| 4,965,725 A | 10/1990 | Rutenberg |
| 5,068,906 A | 11/1991 | Kosaka |

(Continued)

FOREIGN PATENT DOCUMENTS

| | | |
|---|---|---|
| DE | 39 22 358 A1 | 1/1991 |
| EP | 0 213 666 A1 | 3/1987 |
| EP | 0 557 558 A1 | 9/1993 |
| EP | 0 713 086 A1 | 5/1996 |
| GB | 1 404 628 | 9/1975 |
| JP | 11-097342 | 4/1999 |
| WO | WO 92/13308 A1 | 8/1992 |
| WO | WO 93/14594 A1 | 8/1993 |
| WO | WO 97/04347 A1 | 2/1997 |
| WO | WO 97/20197 A2 | 6/1997 |

(Continued)

OTHER PUBLICATIONS

Gaddipati et al., "An Efficient Method for Automated Segmentation of Histochemically Stained Slides," IEEE–EMBC and CMBEC (1995).

(Continued)

*Primary Examiner*—Anjan K. Deb (57) ABSTRACT

A system for processing a thumbnail image from a microscope slide to determine tissue locations on the slide. The system comprises an image cropping component, a tissue finding component, and a scan control component. The image cropping component crops the thumbnail image and removes portions of the image that fall outside of determined slide boundaries. The cropped image from the image cropping component is inputted into the tissue finding component. The tissue finding component identifies tissue regions by applying a sequence of filters that incorporate knowledge of typical appearance and location of tissue and non-tissue slide regions. The tissue finding component outputs a tiling matrix whose values indicate which tiles should be imaged. The scan control component interprets the tiling matrix and transposes positions of the tiling matrix into actual stage coordinate for a microscopic imaging.

U.S. PATENT DOCUMENTS

| | | |
|---|---|---|
| 5,072,382 A | 12/1991 | Kamentsky |
| 5,073,857 A | 12/1991 | Peters et al. |
| 5,099,521 A | 3/1992 | Kosaka |
| 5,107,422 A | 4/1992 | Kamentsky et al. |
| 5,123,056 A | 6/1992 | Wilson |
| 5,143,193 A | 9/1992 | Geraci |
| 5,149,972 A | 9/1992 | Fay et al. |
| 5,163,095 A | 11/1992 | Kosaka |
| 5,216,500 A | 6/1993 | Krummey et al. |
| 5,216,596 A | 6/1993 | Weinstein |
| 5,218,645 A | 6/1993 | Bacus |
| 5,252,487 A | 10/1993 | Bacus et al. |
| 5,257,182 A | 10/1993 | Luck et al. |
| 5,260,871 A | 11/1993 | Goldberg |
| 5,268,966 A | 12/1993 | Kasdan |
| 5,287,272 A | 2/1994 | Rutenberg et al. |
| 5,297,034 A | 3/1994 | Weinstein |
| 5,313,532 A | 5/1994 | Harvey et al. |
| 5,333,207 A | 7/1994 | Rutenberg |
| 5,363,258 A | 11/1994 | Coles et al. |
| 5,381,224 A | 1/1995 | Dixon et al. |
| 5,417,215 A | 5/1995 | Evans et al. |
| 5,428,690 A | 6/1995 | Bacus et al. |
| 5,471,561 A | 11/1995 | Cowgill et al. |
| 5,473,706 A | 12/1995 | Bacus et al. |
| 5,499,097 A | 3/1996 | Ortyn et al. |
| 5,505,946 A | 4/1996 | Kennedy et al. |
| 5,544,650 A | 8/1996 | Boon et al. |
| 5,544,996 A | 8/1996 | Castaldi et al. |
| 5,625,765 A | 4/1997 | Ellenby et al. |
| 5,636,425 A | 6/1997 | Best |
| 5,638,459 A | 6/1997 | Rosenlof et al. |
| 5,647,025 A | 7/1997 | Frost et al. |
| 5,680,694 A | 10/1997 | Best |
| 5,687,251 A | 11/1997 | Erler et al. |
| 5,700,125 A | 12/1997 | Falace et al. |
| 5,740,270 A | 4/1998 | Rutenberg et al. |
| 5,768,125 A | 6/1998 | Zinger et al. |
| 5,784,162 A | 7/1998 | Cabib et al. |
| 5,796,861 A | 8/1998 | Vogt et al. |
| 5,835,620 A | 11/1998 | Kaplan et al. |
| 5,838,837 A | 11/1998 | Hirosawa et al. |
| 5,848,177 A | 12/1998 | Bauer et al. |
| 5,878,152 A | 3/1999 | Sussman |
| 5,912,699 A | 6/1999 | Hayenga et al. |
| 5,933,519 A | 8/1999 | Lee et al. |
| 6,014,451 A | 1/2000 | Berry et al. |
| 6,031,930 A | 2/2000 | Bacus et al. |
| 6,049,421 A | 4/2000 | Raz et al. |
| 6,081,612 A | 6/2000 | Gutkowicz-Krusin et al. |
| 6,091,842 A | 7/2000 | Domanik et al. |
| 6,101,265 A | 8/2000 | Bacus et al. |
| 6,151,405 A | 11/2000 | Douglass et al. |
| 6,172,349 B1 | 1/2001 | Katz et al. |
| 6,226,392 B1 | 5/2001 | Bacus et al. |
| 6,233,480 B1 | 5/2001 | Hochman et al. |
| 6,272,235 B1 | 8/2001 | Bacus et al. |
| 6,466,690 B2 | 10/2002 | Bacus et al. |
| 6,498,006 B2 | 12/2002 | Wong |
| 6,545,265 B1 | 4/2003 | Czarnetzki et al. |
| 6,711,283 B1 | 3/2004 | Soenksen |
| 6,920,239 B2 | 7/2005 | Douglass et al. |

FOREIGN PATENT DOCUMENTS

| | | |
|---|---|---|
| WO | WO 98/39728 A1 | 9/1998 |
| WO | WO 01/37192 A1 | 5/2001 |
| WO | WO 01/61626 A1 | 8/2001 |
| WO | WO 92/17848 A1 | 10/2002 |

OTHER PUBLICATIONS

Wang et al., "Automatic Threshold Selection Using Histogram Quantization," Journal of BioMedical Optics, vol. 2, No. 2 (Apr. 1997).

Borga et al., "FSED–Feature Selective Edge Detection," (2000).

Illumea Product Group Internet Page <http://www.illumea.com/800–823–3203/products/>.

Boone et al., "Biomarkers of Premalignant Breast Disease and Their Use as Surrogate Endpoints in Clinical Trials of Chemopreventive Agents," The Breast Journal, vol. 1, No. 4 (1995).

Kelloff et al., "Development of Breast Cancer Chemopreventive Drugs," Journal of Cellular Biochemistry, 17G:2–13 (1993).

Boone et al., "Development of Surrogate Endpoint Biomarkers for Clinical Trials of Cancer Chemopreventive Agents: Relationships to Fundamental Properties of Preinvasive (Intraepithelial) Neoplasia," Journal of Cellular Biochemistry, Supplement 19:10–22 (1994).

Pressman, Norman J., "Markovian Analysis of Cervical Cell Images," The Journal of Histochemistry and Cytochemistry, vol. 24, No. 1, 138–144 (1976).

Bacus et al., "Quantiation of Preinvasive Neoplastic Progression in Animal Models of Chemical Carcinogenesis," Journal of Cellular Biochemistry Supplements 28/29:21–38 (1997).

Dawson et al., "Analytical and Quantitative Cycology and Hiscology," Chromatin Texture Measurement by Markovian Analysis (1997).

Russ, John C., The Image Processing Handbook—$2^{nd}$ ed. (1995).

Dance et al., "Segmentation of Mammograms Using Multiple Linked Self–Organizing Neural Networks," Med. Phys. 22(2) (Feb. 1995).

Zhang et al., "Hough Spectrum and Geometric Texture Feature Analysis" (1994).

Bacus, James W., Cervical Cell Recognition and Morphometric Grading by Image Analysis, Journal of Cellular Biochemistry, Supplement 23:33–42 (1995).

Pereira et al., "Detection and Characterization of Microcalcifications in Mammographic Images," (1996).

Weaver B A et al., "Performance of the Ultraheavy Collector of the Trex Experiment," Nuclear Instruments & Methods in Physics Research Section B, Nov. 1998, 409–428, vol. 145, No. 3, Notho–Holland Publishing Company Amsterdam, NL.

Baxes G.A., "Digital Image Processing: Principles and Applications," 1994, pp. 127–139, John Wiley & Sons, New York (16 pages).

Dennis A Silage and Joan Gil, Digital Image Tiles: A Method for the Processing of Large Sections, Journal of Microscopy, vol. 138, Pt. 2, May 1985, pp. 221–227, The Royal Microscopical Society.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–12, dependent on an amended claim, are determined to be patentable.

New claims 13–21 are added and determined to be patentable.

1. A *computer implemented* method for processing a low resolution *digital* image from a slide to determine a specimen [locations] *location* on the slide, the *computer implemented* method comprising:
   cropping the low resolution *digital* image to remove portions of the low resolution *digital* image that correspond to non-slide objects, said cropping including determining a location of at least one boundary by searching at least one interval corresponding to at least one boundary region, *the cropping resulting in a cropped digital image*;
   inputting the cropped *digital* image into a tissue finding component, wherein the tissue finding component identifies a region containing the specimen by applying a filter that incorporates knowledge of typical appearance and location of specimen and non-specimen slide regions and outputs a matrix whose values indicate which regions of the slide should be imaged, the matrix not including portions of the image falling outside of the boundary; and
   transposing position of the matrix into actual *microscope* stage coordinates, and capturing a microscope image at those stage coordinates.

13. *A method as in claim 1, further comprising obtaining the low resolution image of the entire slide at once using a macro camera.*

14. *A method as in claim 11, wherein said flat field correcting comprises removing spatial light anomalies from the low resolution image.*

15. *A method as in claim 1, wherein said cropping comprises first determining an approximate location of a slide boundary, and second revising and fine-tuning said estimate.*

16. *A method as in claim 6, wherein said identifying pixel blocks comprises identifying remnants from a slide which may not be oriented perfectly horizontally within the low resolution image.*

17. *A method as in claim 1, wherein said tissue finding component uses a pixel mean intensity to differentiate tissue containing regions from tissue non-containing regions.*

18. *A method as in claim 1, wherein said tissue finding component uses a standard deviation representing an amount of variation between pixel values to determine a border between tissue and blank side.*

19. *A method as in claim 1, wherein said tissue finding component uses both of a pixel mean intensity, and a standard deviation representing an amount of variation between pixel values, to determine a border between tissue and blank side.*

20. *The method as in claim 1, wherein said matrix has a one-to-one correspondence to a field of view of the microscope image which will be captured.*

21. *The method as in claim 1, wherein said cropping is carried out by a computer which automatically determines locations for the cropping.*

\* \* \* \* \*